(12) United States Patent
Nguyen et al.

(10) Patent No.: US 11,789,220 B1
(45) Date of Patent: Oct. 17, 2023

(54) LIFTABLE HEAT SINK DESIGN WITH THERMAL INTERFACE MATERIAL FOR PLUGGABLE OPTICAL MODULES

(71) Applicant: Amazon Technologies, Inc., Seattle, WA (US)

(72) Inventors: Tri Nguyen, San Jose, CA (US); Hogan Lew, Sunnyvale, CA (US); Srinivas S. Chebrolu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/706,523

(22) Filed: Mar. 28, 2022

(51) Int. Cl.
*H04B 10/00* (2013.01)
*G02B 6/42* (2006.01)
*G02B 6/43* (2006.01)

(52) U.S. Cl.
CPC ............. *G02B 6/4269* (2013.01); *G02B 6/43* (2013.01)

(58) Field of Classification Search
CPC ................................ G02B 6/4269; G02B 6/43
See application file for complete search history.

(56) References Cited

U.S. PATENT DOCUMENTS

| | | | |
|---|---|---|---|
| 7,036,574 B2 * | 5/2006 | Thompson | F28D 15/0233 165/185 |
| 7,355,857 B2 * | 4/2008 | Pirillis | H05K 9/0058 361/689 |
| 7,507,102 B1 * | 3/2009 | Bandholz | H01R 12/85 439/342 |
| 7,733,652 B2 * | 6/2010 | Costello | H05K 5/0286 361/704 |
| 7,974,098 B2 * | 7/2011 | Oki | G02B 6/4201 165/185 |
| 9,126,405 B2 * | 9/2015 | Sugiura | B41J 2/04581 |
| 9,453,972 B1 * | 9/2016 | Arvelo | G02B 6/3825 |
| 10,212,852 B1 * | 2/2019 | Reddy | F28F 3/022 |
| 10,256,578 B2 * | 4/2019 | Jandt | H01R 9/03 |
| 10,310,198 B1 * | 6/2019 | Yatskov | G02B 6/4261 |
| 10,401,581 B2 * | 9/2019 | Gaal | H05K 7/20154 |
| 10,492,335 B1 * | 11/2019 | Hung | H05K 7/2049 |
| 10,770,842 B2 * | 9/2020 | Jin | H01R 13/426 |
| 10,795,100 B2 * | 10/2020 | Leigh | G06F 1/185 |
| 10,925,186 B2 * | 2/2021 | Selvidge | H05K 7/20509 |
| 11,079,560 B2 * | 8/2021 | Leigh | G02B 6/4246 |
| 11,089,716 B2 * | 8/2021 | Hall, III | H05K 7/2049 |
| 11,372,179 B2 * | 6/2022 | Duan | G02B 6/4269 |
| 2004/0027816 A1 * | 2/2004 | Ice | G02B 6/4201 361/797 |

(Continued)

*Primary Examiner* — Agustin Bello
(74) *Attorney, Agent, or Firm* — Alexander A. Knapp; Kowert, Hood, Munyon, Rankin & Goetzel, P.C.

(57) ABSTRACT

Various apparatus are disclosed for lifting heat sinks during insertion of optical modules into transceiver cages (e.g., housings). The apparatus also provide for lifting of the heat sink during removal of the optical modules from the transceiver cages. While the heat sink is lifted during insertion or removal, the heat sink is in contact with the surface of the optical module when the optical module is fully inserted in the transceiver cage. Lifting of the heat sink during insertion and removal of the optical module allows a thermal interface material (TIM) to be placed on the surface of the heat sink in contact with the optical module to improve thermal conduction between the optical module and the heat sink.

20 Claims, 6 Drawing Sheets

(56) References Cited

U.S. PATENT DOCUMENTS

| | | | | |
|---|---|---|---|---|
| 2005/0083659 | A1* | 4/2005 | Gattuso | H05K 7/1007 257/E23.086 |
| 2005/0220425 | A1* | 10/2005 | Kropp | G02B 6/4292 385/88 |
| 2009/0296350 | A1* | 12/2009 | Oki | G02B 6/4269 361/709 |
| 2009/0296351 | A1* | 12/2009 | Oki | G02B 6/4246 361/709 |
| 2010/0067196 | A1* | 3/2010 | Costello | H05K 7/20509 361/709 |
| 2012/0243168 | A1* | 9/2012 | Tanaka | G11B 33/144 361/679.32 |
| 2015/0282382 | A1* | 10/2015 | Nguyen | H05K 7/183 361/715 |
| 2017/0269314 | A1* | 9/2017 | Gaal | G02B 6/4261 |
| 2019/0306985 | A1* | 10/2019 | Ferguson | H01R 12/88 |
| 2021/0103108 | A1* | 4/2021 | Wall, Jr. | G02B 6/4269 |
| 2021/0307204 | A1* | 9/2021 | Lu | H05K 7/20436 |
| 2022/0011056 | A1* | 1/2022 | Gupta | H05K 7/20418 |
| 2022/0052474 | A1* | 2/2022 | Chiu | G02B 6/4261 |
| 2022/0141990 | A1* | 5/2022 | Gupta | H05K 7/2039 361/709 |

* cited by examiner

LIFTABLE HEAT SINK DESIGN WITH THERMAL INTERFACE MATERIAL FOR PLUGGABLE OPTICAL MODULES

BACKGROUND

Computer systems include a number of components that generate waste heat. Such components may include mass storage devices, power supplies, and processors. Additionally, connector components may also generate waste heat. Datacenter traffic (e.g., server, switch system traffic) has increased significantly recently and will continue to increase in the foreseeable future. The increase in traffic presents a challenge to datacenter networks as the speed and technology of various datacenter networks have evolved quickly to meet the challenge of increased traffic. For instance, in many installations, optical interconnects (e.g., pluggable optical modules) have replaced copper cables between the connected network devices to improve the speed of data transfer. The power of these pluggable optical modules has increased over time from 12 W modules to 24 W, 33 W, and even 40 W in the near future. With these high powers, effective thermal design in shedding waste heat is necessary to maintain durable operation of the optical interconnects and the datacenter. For example, thermal design involving the optical module, transceiver cage, external heat sinks, and embedded heat sinks along with system airflow design as a whole are needed to provide suitable operation of datacenters using optical interconnects.

Figure 2:
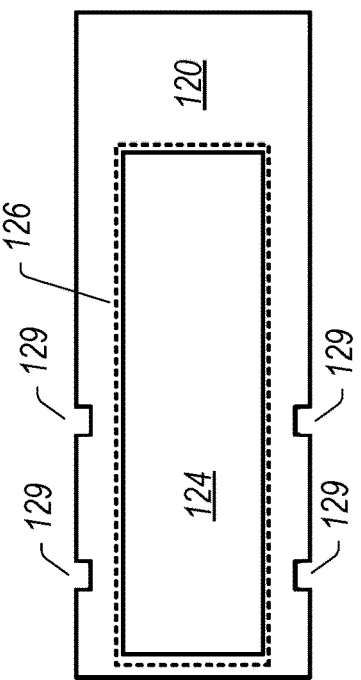
FIG. 2 depicts a bottom view perspective of an example embodiment of a heat sink with a thermal interface material (TIM) attached to the bottom surface of the heat sink.

The various embodiments described herein are susceptible to various modifications and alternative forms. Specific embodiments are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Signal interface devices (such as optical modules) can generate large amounts of excess heat due to their high power transfer rates. As described above, thermal design considerations need to be taken into account for datacenters implementing signal interface devices in order to efficiently shed waste heat and maintain durable operation of the datacenters. While advances have been made in many aspects of thermal design, the contact thermal resistance (e.g., dry contact resistance) between a pluggable optical module (e.g., signal interface device) and a heat sink continues to be a significant issue along the heat conduction path associated with the use of optical modules. In most signal interface devices, however, a thermal interface material (e.g., TIM) cannot be used effectively to improve the thermal conduction between the device and the heat sink because the TIM is likely to get damaged or smeared away with multiple insertion and removal iterations of the device from a housing associated with the heat sink. Additionally, permanent signal interface devices that do not allow for insertion or removal are undesirable due to the general nature of datacenter operation.

To solve these problems with signal interface devices and heat sinks, various embodiments described herein include apparatus capable of providing safe insertion and removal of signal interface devices (e.g., optical modules) from housings (e.g., transceiver cages) attached to heat sinks while also enabling contact between the surfaces of the signal interface devices with TIM on surfaces of the heat sinks, when the signal interface devices are fully engaged in the transceiver cages. For example, various embodiments of apparatus are contemplated in which the heat sink is lifted to provide clearance between the lower surface of the heat sink (and the attached TIM) and the upper surface of the signal interface device as the signal interface device is inserted and removed from the housing. Additionally, the contemplated embodiments provide a compressing force between the heat sink and the signal interface device when the device is fully inserted into the housing. This compressing force can compress the TIM on the heat sink, increasing heat conduction between the signal interface device and the heat sink.

Figure 1:
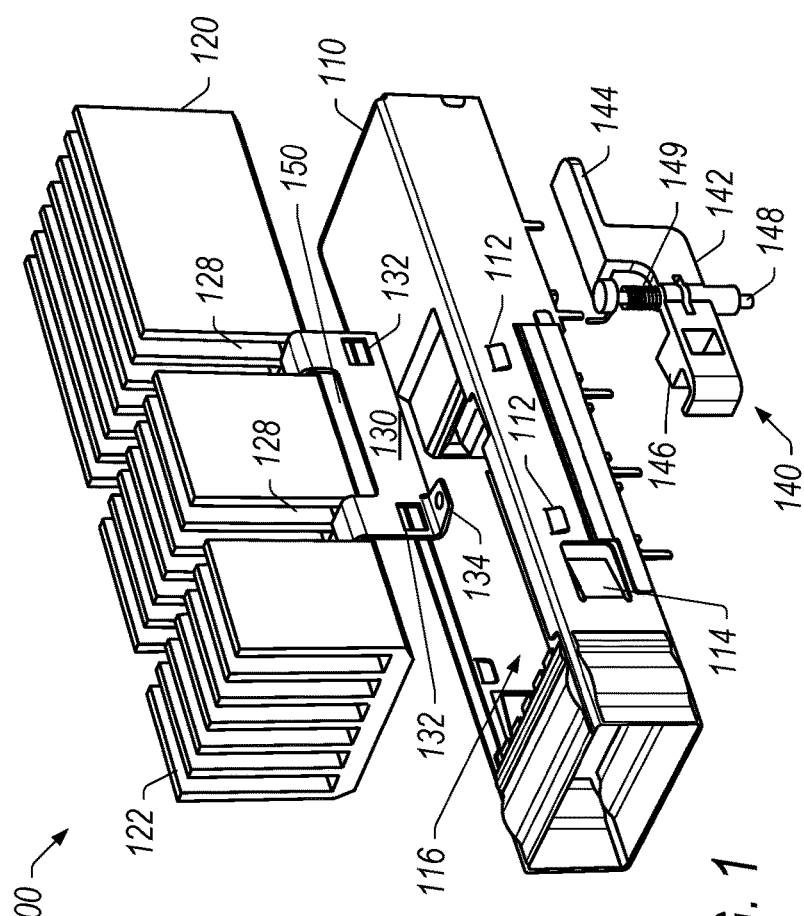
FIG. 1 depicts an exploded, perspective view representation of an apparatus with a liftable heat sink, according to some embodiments.

FIG. 1 depicts an exploded, perspective view representation of an apparatus with a liftable heat sink, according to some embodiments. In the illustrated embodiment, apparatus 100 includes housing 110 and heat sink 120. In certain embodiments, housing 110 is a transceiver cage. For instance, housing 110 may be an electromagnetic interference (EMI) cage. In some instances, housing 110 may be referred to as a socket (e.g., an EMI socket). For example, housing 110 may be a cage or socket attached to a printed circuit board (PCB) or other substrate. EMI cages (or sockets) are typically manufactured to standards according to an MSA (Multiple Source Agreement) and thus have standard designs regardless of supplier. For instance, housing 110 may be a transceiver cage manufactured according to QSFP-DD, OSFP, or other MSA standards. In various embodiments, housing 110 may be capable of receiving a signal interface device (e.g., a standard optical module), as described herein.

Heat sink 120 includes fins 122. Fins 122 provide an increased area for heat removal from heat sink 120. The size, shape, number, and area of fins 122 may be varied based on design needs for heat sink 120. In certain embodiments, a thermal interface material (TIM) is attached to a lower (e.g., bottom) surface of heat sink 120. FIG. 2 depicts a bottom view perspective of an example embodiment of heat sink 120 with thermal interface material (TIM) 124 attached to the bottom surface of the heat sink. TIM 124 may be, for example, a thermally conductive material that can be compressed between two surfaces to increase thermal conduction between the surfaces. In one contemplated embodiment, TIM 124 is a silicone material mixed with metal to increase thermal conductivity of the silicone.

In various embodiments, a coating is applied to TIM 124 to reduce friction and inhibit tearing of the TIM. The coating may also be used as an adhesive for TIM 124 to be attached to a surface. For instance, in some embodiments, membrane 126 is used to attach TIM 124 to heat sink 120. Membrane 126 may be, for example, a material that contains and supports TIM 124 while providing for attachment (such as through adhesion) of the membrane to heat sink 120. Additionally, membrane 126 may reduce friction against a surface opposite heat sink 120 (e.g., against a surface of a cage or signal interface device, as described herein). For example, in some embodiments a thermally conductive polymer membrane (such as polyimide) may be used to enclose TIM 124, adhere the TIM to heat sink 120, and reduce friction against another surface. In various embodiments, membrane 126 may also contain TIM 124 to prevent loss of the TIM during thermal cycling.

Figure 3:
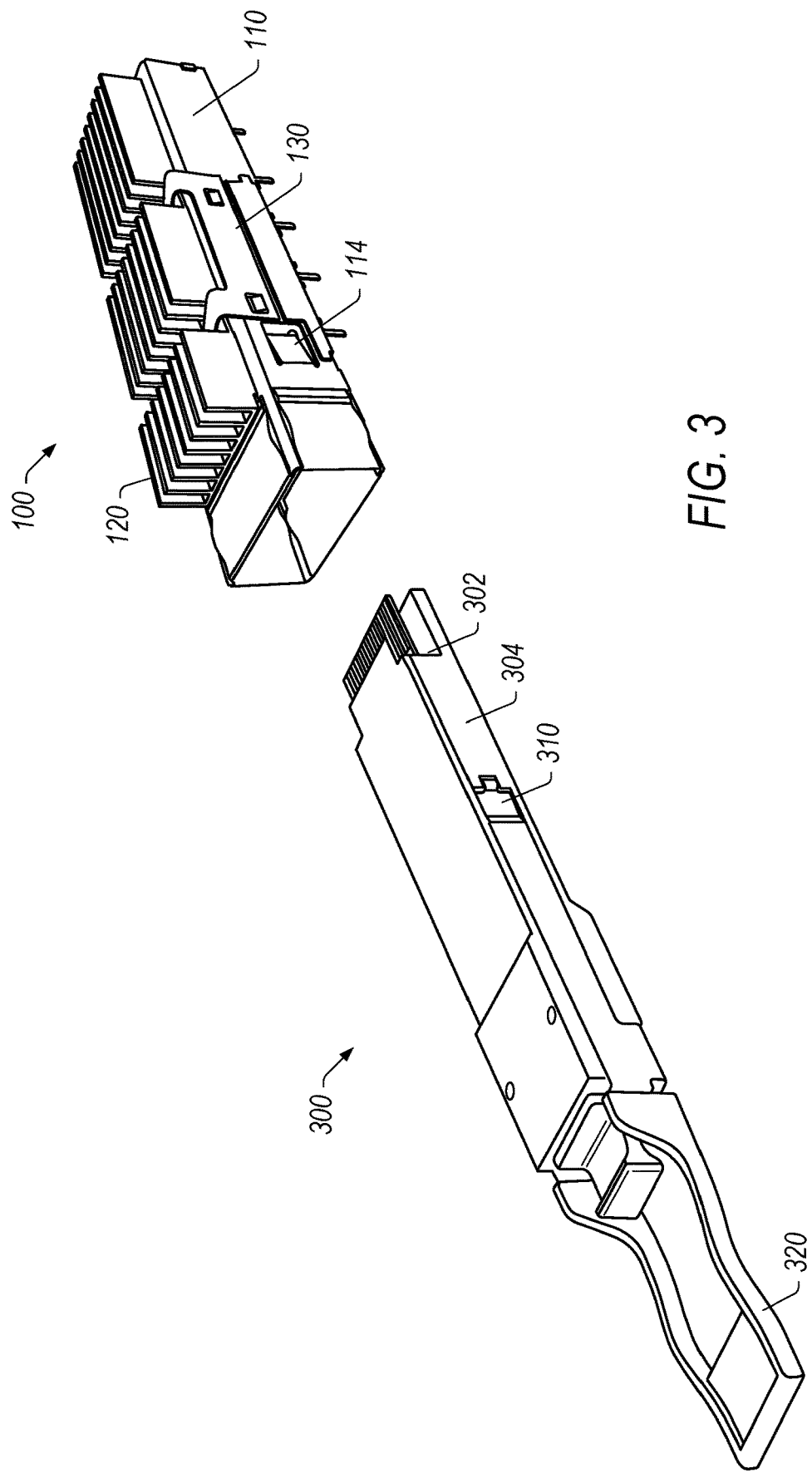
FIG. 3 depicts a perspective view representation of a lift apparatus along with a signal interface device, according to some embodiments.

Turning back to FIG. 1, in various embodiments, apparatus 100 includes spring clip 130 and actuator mechanism 140. Spring clip 130 may be, for example, a clip-shaped spring mechanism that provides a spring force. In the illustrated embodiment, spring clip 130 is positioned in slots 128 in heat sink 120. Spring clip 130 includes openings 132. Openings 132 may be "catch" openings configured to engage with catches 112 on housing 110. Engagement between openings 132 and catches 112 couples spring clip 130 to housing 110. When spring clip 130 is coupled (e.g., attached) to housing 110 (as shown in FIG. 3, described further below), the spring force provided by spring clip 130 moves (e.g., pulls) heat sink 120 towards housing 110 (e.g., the heat sink and housing are brought together by the spring force). In some embodiments, heat sink 120 includes notches 129 (shown in FIG. 2) that align with slots 128 to allow spring clip 130 to be inset into the sides of the heat sink. For example, the size of notches 129 may be designed to accommodate any difference in width between heat sink 120 and cage 110 to allow openings 132 to engage catches 112.

In certain embodiments, actuator mechanism 140 is a lever mechanism. For instance, as shown in FIG. 1, actuator mechanism 140 may include lever 142. Lever 142 may include insertion portion 144 and activator portion 146 on opposing sides of axle 148. Axle 148 may be positioned inside an opening in lever 142 and secured in place on the lever. In some embodiments, spring 149 is placed on axle 148. Spring 149 may be, for instance, a torsional spring that provides a rotational force to lever 142. For instance, in one embodiment, spring 149 provides a rotational force that causes lever 142 to return to a normal position on axle 148, which is the position shown in FIG. 1. Thus, when lever 142 is rotated by other forces, as described herein, spring 149 provides the force to return lever to the normal position. Embodiments may also be contemplated where the rotational force is provided by other mechanisms. For instance, a leaf spring could be implemented instead of axle 148 and spring 149 to provide the rotational force to lever 1422.

It should be noted that while actuator mechanism 140 is depicted on only one side of housing 110, heat sink 120, and spring clip 130, in certain embodiments, apparatus 100 includes actuator mechanisms on both sides of the apparatus (e.g., on both the left and right sides of the apparatus). FIG. 1 depicts a right side actuator mechanism on a right side of apparatus 100. Accordingly, apparatus 100 would typically include a left side actuator mechanism that mirrors the depicted right side actuator mechanism shown in FIG. 1. Having two actuator mechanisms, one on each side of apparatus 100 may provide for balanced movement (e.g., lifting) of heat sink 120 during connection of a signal interface device (e.g., an optical module) to the apparatus, as described herein. It should also be noted that while actuator mechanism 140 is depicted as being attached to spring clip 130 in the disclosed embodiments, additional embodiments may be contemplated where the actuator mechanism is attached (e.g., mounted) to other structures. For instance, one or more components of actuator mechanism 140 (such as axle 148) may be mounted to a printed circuit board (or other structure) external to housing 110.

In certain embodiments, spring clip 130 includes axle tab 134. Axle tab 134 may extend outwards from the lower portion of spring clip 130. Axle 148 may be positioned in the opening in axle tab 134 to couple lever 142 to spring clip 130. With axle 148 in the opening in axle tab 134, lever 142 rotates about the opening in the axle tab. In various embodiments, when lever 142 is attached to spring clip 130, insertion portion 144 is positioned to be able to move (e.g., rotate) into opening 150 between the spring clip and heat sink 120. Thus, insertion portion 144 is able to move into the space underneath heat sink 120 while lever 142 is attached to spring clip 130. In some embodiments, insertion portion 144 has a beveled (e.g., angled) leading edge. The beveled leading edge may ease insertion of insertion portion 144 under heat sink 120 and provide leverage for the insertion portion to lift heat sink 120, as described herein. The beveled leading edge may also allow insertion portion 144 to move underneath heat sink 120 without damaging TIM 124 or membrane 126.

As shown in FIG. 1, housing 110 includes catches 112 (described above), tabs 114, and opening 116. Each of catches 112, tabs 114, and opening 116 may be standard parts of a design of housing 110 (e.g., standard parts of a transceiver cage). Tabs 114 may be, for example, lock tabs on a transceiver cage that engage with latches on a signal interface device. In various embodiments, tabs 114 are capable of moving in and out of their associated openings with a normalizing force having the tabs in their inwards, normal position, which is shown in FIG. 1. As an object (such as an optical module, described herein) is moved into housing 110, however, a surface of the object may engage tabs 114 and move the tabs outwards by overcoming the normalizing force. It should be noted that, as described below, the surface of the object may also have indentations that allows the tabs to move back inwards due to the normalizing force.

Housing 110 may include opening 116 to allow contact between a bottom surface of heat sink 120 device (and TIM 124) with objects in an interior volume of the housing. For example, when an object (such as the signal interface device) is positioned inside housing 110, opening 116 allows contact between the object, TIM 124, and heat sink 120. Providing contact between the object, TIM 124, and heat sink 120 may improve thermal transfer from the object to the heat sink for dissipation of excess heat from the object.

FIG. 3 depicts a perspective view representation of apparatus 100 along with signal interface device 300, according to some embodiments. Signal interface device 300 may include various types of devices that provide an interface (e.g., interconnection) for optical signal transmission and/or electrical signal transmission. In some embodiments, signal interface device 300 may be referred to as a signal interconnect device. In certain embodiments, signal interface device 300 is an optical transceiver, an optical transmitter, or an optical receiver. For instance, in one embodiment, signal interface device 300 is an optical module. Other examples of signal interface devices include, but are not limited to, wireless modules and DAC (direct attach cable) modules. Signal interface device 300 may be any interface device configured to be coupled to housing 110 (e.g., the transceiver cage). In some contemplated embodiments, signal interface device 300 is an optical module manufactured according to MSA standards. For instance, in one contemplated embodiment, both signal interface device 300 and housing 110 are manufactured according to QSFP MSA standards.

In certain embodiments, device 300 (e.g., the signal interface device) includes latches 310 and pull tab 320. Latches 310 may engage with tabs 114 in housing 110 to "lock" device 300 to the housing when the device is fully inserted in the housing (e.g., the signal interface device is fully received in the housing). For instance, as signal interface device 300 is pushed inside of housing 110 and after leading edge 302 passes tabs 114, side walls 304 (e.g., the outer surfaces) of the signal interface device push tabs 114 outwards until the tabs engage latches 310 and move back inwards when signal interface device 300 is fully received in housing 110. The movement of tabs 114 back inwards while engaging latches 310 secures (e.g., locks) the tabs to the latches. Locking of latches 310 to tabs 114 secures signal interface device 300 in housing 110 and prevents incidental removal or disengagement of the signal interface device.

Pull tab 320 may be referred to as a signal interface device removal mechanism. Thus, activation of pull tab 320 (e.g., the removal mechanism) enables removal of signal interface device 300 from housing 110. For instance, pull tab 320 may be connected to latches 310 such that when the pull tab is pulled by an operator, the pull tab pulls latches 310 forward and pushes tabs 114 outward to disengage the latches from tabs 114. Accordingly, signal interface device 300 is unlocked from housing 110 as the signal interface device is pulled out of the housing.

Various embodiments are now described (as detailed in FIG. 4 below) for the operation of spring clip 130 and actuator mechanism 140 during insertion of signal interface device 300 into housing 110. During insertion of signal interface device 300 into housing 110, spring clip 130 and actuator mechanism 140 operate to lift heat sink 120 as the signal interface device is inserted in the housing. Lifting of heat sink 120 provides clearance between the bottom surface of the heat sink and signal interface device 300 to prevent the signal interface device from damaging the heat sink or TIM 124. As signal interface device 300 is fully inserted (e.g., fully received) in housing 110, spring clip 130 and actuator mechanism 140 operate to lower heat sink 120 back into position such that TIM 124 on the bottom surface of the heat sink contacts the upper surface of signal interface device 300. Contact between TIM 124 and the upper surface of signal interface device 300 enables heat transfer from the signal interface device to heat sink 120 for efficient dissipation of excess heat from the signal interface device.

Figure 4:
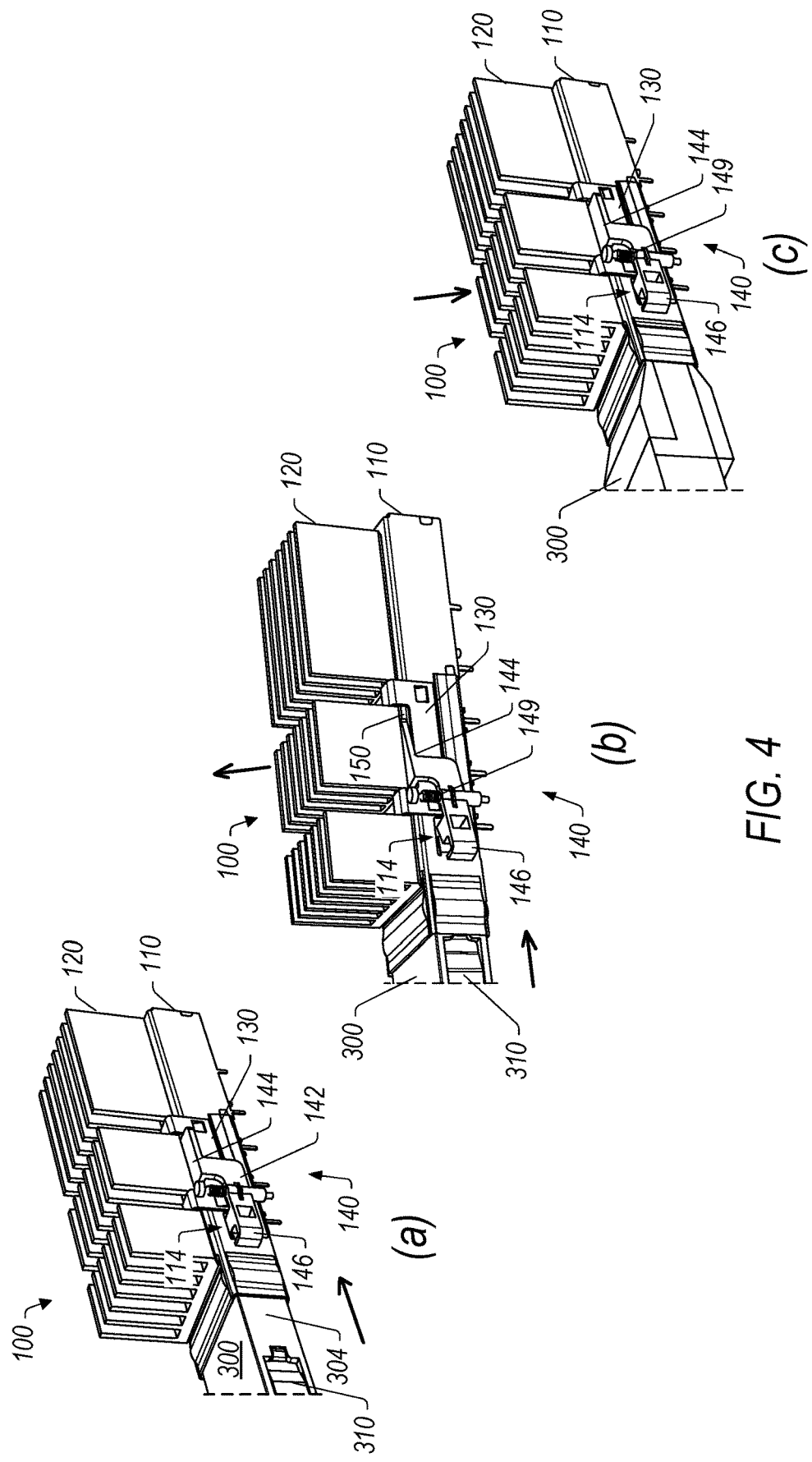
FIG. 4 depicts perspective views of various stages of insertion of a signal interface device into a lift apparatus, according to some embodiments.

FIG. 4 depicts perspective views of various stages of insertion of signal interface device 300 into apparatus 100, according to some embodiments. In (a), signal interface device 300 is being initially inserted into housing 110 in apparatus 100. In (a), the leading edge of the outer surface of signal interface device (e.g., leading edge 302, shown in FIG. 3) has yet to engage with tabs 114 (hidden from view behind activator portion 146 of lever 142) in housing 110.

As signal interface device 300 is further inserted into housing 110, side walls 304 (e.g., the outer surfaces) push outward on tabs 114 once the signal interface device is inserted (e.g., received) into the housing to a specified position. The specified position may be, for example, the position at which side walls 304 begin to engage tabs 114. The outward movement of tabs 114 causes activator portion 146 of lever 142 to rotate outwards (overcoming the force of spring 149), as shown in (b) of FIG. 4. The rotation of activator portion 146 outwards rotates insertion portion 144 inwards and into opening 150 under heat sink 120. Accordingly, insertion portion 144 inserts between the bottom surface of heat sink 120 and the upper surface of housing 110, lifting the heat sink away from the housing, shown by the arrow above the heat sink 120.

In certain embodiments, heat sink 120 is lifted away from housing 110 to provide a clearance that allows signal interface device 300 to move into the housing without contacting TIM 124 on the bottom surface of the heat sink. The clearance needed may be determined by the thickness of TIM 124 or other dimensions of apparatus 100. The thickness of insertion portion 144 may be designed to provide the clearance needed between the bottom surface of heat sink 120 and the upper surface of housing 110 based on the thickness of the insertion portion.

After heat sink 120 is lifted, signal interface device 300 may continue to be moved into housing 110. As signal interface device 300 continues to move into housing 110, heat sink 120 remains lifted (e.g., lever 142 remains rotated with insertion portion 144 under the heat sink) until latches 310 on the signal interface device engage tabs 114 on the housing. Once latches 310 engage tabs 114 at the fully inserted (e.g., fully received) position, which is beyond the position when the tabs move outwards, the tabs move back inwards (as described above). As tabs 114 move back inwards, activator portion 146 rotates back inwards along with the tabs due to the rotation force provided by spring 149 in actuator mechanism 140. Eventually, lever 142 returns to its original position, as shown in (c) with insertion portion 144 out of opening 150 and heat sink 120 moves downwards towards housing 110, shown by the arrow above the heat sink, due to the spring force applied by spring clip 130. In (c), signal interface device 300 is fully inserted (e.g., fully received) in housing 110 and contact is made between the upper surface of the signal interface device and the bottom surface of heat sink 120, thereby providing heat transfer from the signal interface device while the signal interface device is secured to the housing, as described herein. In some embodiments, the spring force provided by spring clip 130 causes TIM 124 to be compressed when in contact with signal interface device 300. Compression of TIM 124 may further increase thermal conduction between signal interface device 300 and heat sink 120.

Figure 5:
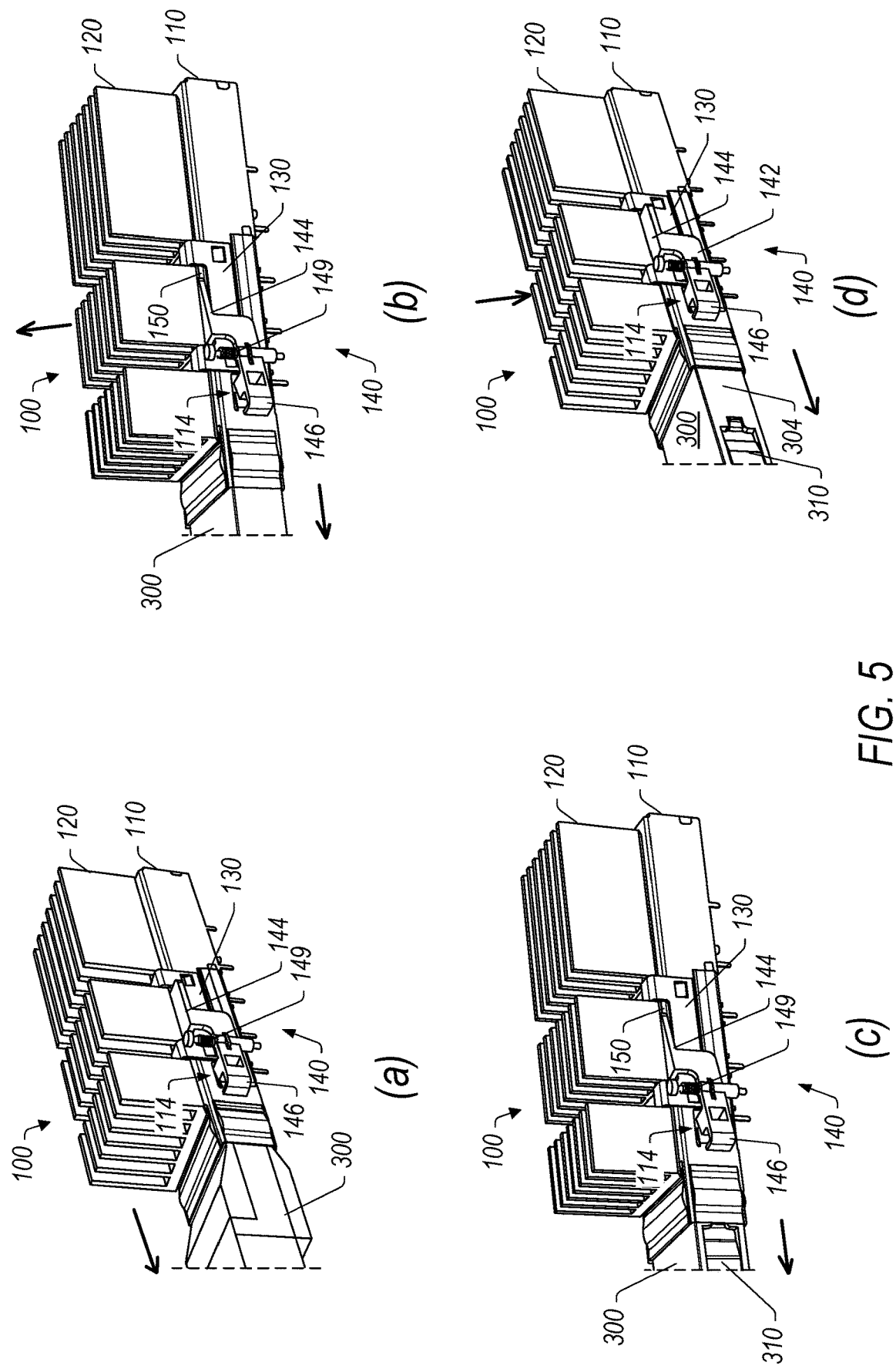
FIG. 5 depicts perspective views of various stages of removal of a signal interface device from a lift apparatus, according to some embodiments.

Various embodiments for the operation of spring clip 130 and actuator mechanism 140 during removal of signal interface device 300 from housing 110 are now described. FIG. 5 depicts perspective views of various stages of removal of signal interface device 300 from apparatus 100, according to some embodiments. In (a), the removal mechanism of signal interface device 300 is activated (e.g., pull tab 320, shown in FIG. 3, is pulled). Activation of the removal mechanism, pushes latches 310 in signal interface device 300 outwards, causing tabs 114 to move outwards. Movement of tabs 114 outwards causes activator portion 146 of lever 142 to rotate outwards (overcoming the force of spring 149), as shown in (b) of FIG. 5. As during insertion, the rotation of activator portion 146 outwards rotates insertion portion 144 inwards into opening 150 under heat sink 120 and the heat sink is lifted away from housing 110, shown by the arrow above the heat sink.

An operator may simultaneously begin to pull signal interface device 300 out of housing 110 while heat sink 120 is lifted. As signal interface device 300 is pulled out of housing 110, heat sink 120 remains lifted by insertion portion 144, as shown in (c). Heat sink 120 remains lifted as side walls 304 of signal interface device 300 remain engaged with tabs 114. In (d), signal interface device 300 is pulled out of housing 110 to a point where side walls 304 no longer engage with tabs (e.g., leading edge 302, shown in FIG. 3) moves past tabs 114. At this point, tabs 114 move back inwards, causing activator portion 146 to move back inwards and insertion portion 144 to move out from under heat sink 120. Once insertion portion 144 is removed from under heat sink 120, the spring force of spring clip 130 causes the heat sink 120 to move back downwards into contact with housing 110.

As shown in FIG. 5, signal interface device 300 may be removed from housing 110 without damaging heat sink 120 or TIM 124 on the bottom (e.g., lower) surface of the heat sink. The clearance provided by the lifting of heat sink 120 during removal prevents any damage happening, similar to the process during insertion of the signal interface device 300. Accordingly, the addition of spring clip 130 and actuator mechanism 140 to apparatus 100 provide advantageous operation during insertion and removal of signal interface device 300.

Figure 6:
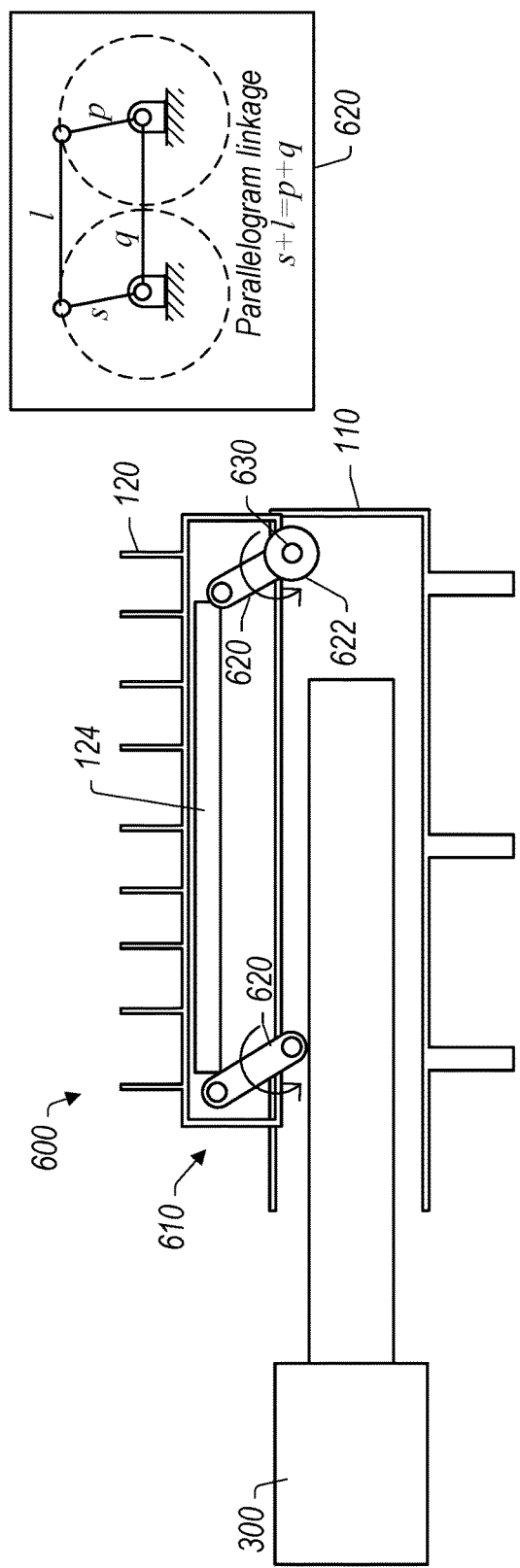
FIGS. 6 and 7 depict side-view representations of an alternative embodiment of a spring and lever mechanism for lifting a heat sink during insertion of a signal interface device into a housing.
Figure 7:
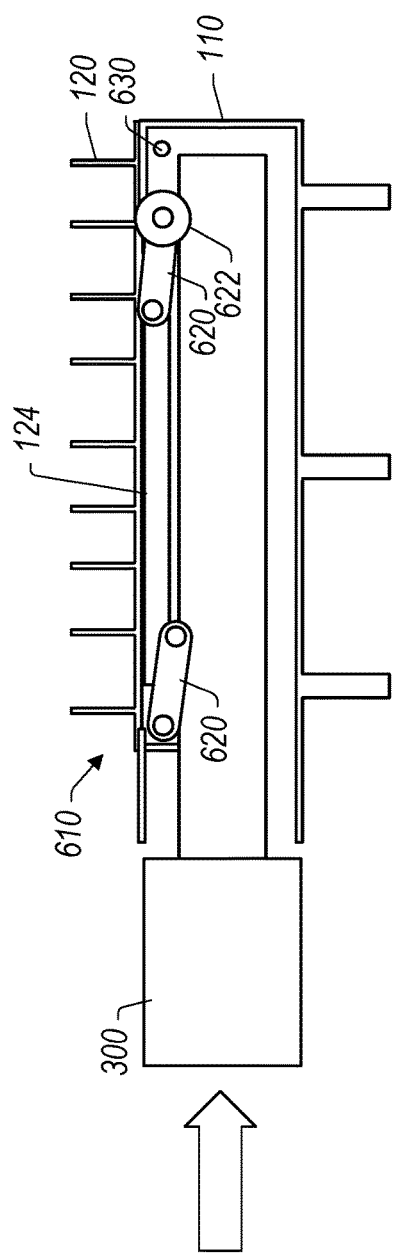

FIGS. 6 and 7 depict side-view representations of an alternative embodiment of a spring and actuator mechanism for lifting a heat sink during insertion of an signal interface device into a housing. In the illustrated embodiment, apparatus 600 includes housing 110, heat sink 120 with TIM 124, and lift mechanism 610. In certain embodiments, lift mechanism 610 includes actuator mechanism 620 and spring mechanism 630. Actuator mechanism 620 may be, for example, a four bar linkage mechanism. Spring mechanism 630 may include a pivot and a torsional spring coupled to one end of actuator mechanism 620. As shown in the inset, actuator mechanism 620 may include a parallelogram linkage operation such that when a lever arm in one end moves, the lever arm in the other end moves correspondingly.

FIG. 6 depicts a half-way insertion point of signal interface device 300 into apparatus 600, according to some embodiments. As shown in FIG. 6, signal interface device 300 engages the first lever arm of actuator mechanism 620 and heat sink 120 is lifted from housing 110. The insertion also begins to cause rotation of both lever arms 630 due to the linkage between the lever arms. As signal interface device 300 moves fully into housing 110, as shown in FIG. 7, the end of signal interface device 300 engages cam roller 622 on the second lever arm of actuator mechanism 620 (the cam roller extending further downward than the other lever arm). This engagement causes rotation of the lever arms to a near horizontal position. In this position, the spring force of the spring in spring mechanism 630 causes heat sink 120 to move downwards onto housing 110. For removal, spring mechanism 630 may move heat sink 120 upwards as signal interface device 300 is pulled out of housing 110.

Figure 8:
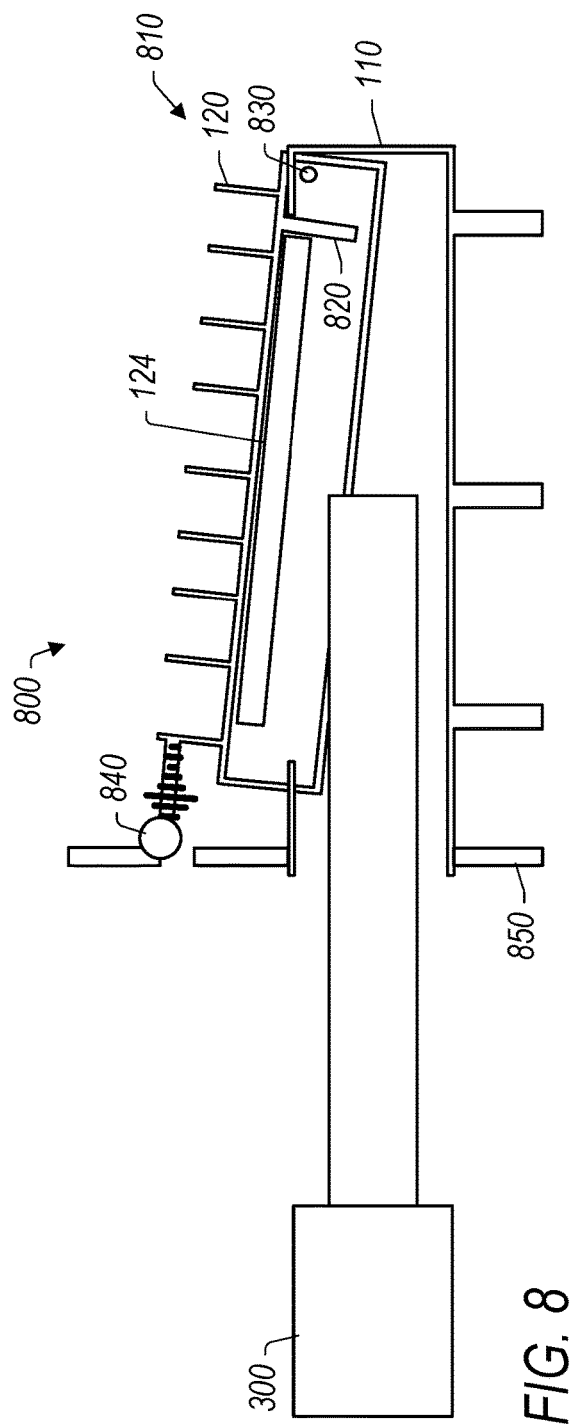
FIGS. 8 and 9 depict side-view representations of another alternative embodiment of a mechanism for lifting a heat sink during insertion of a signal interface device into a housing.
Figure 9:
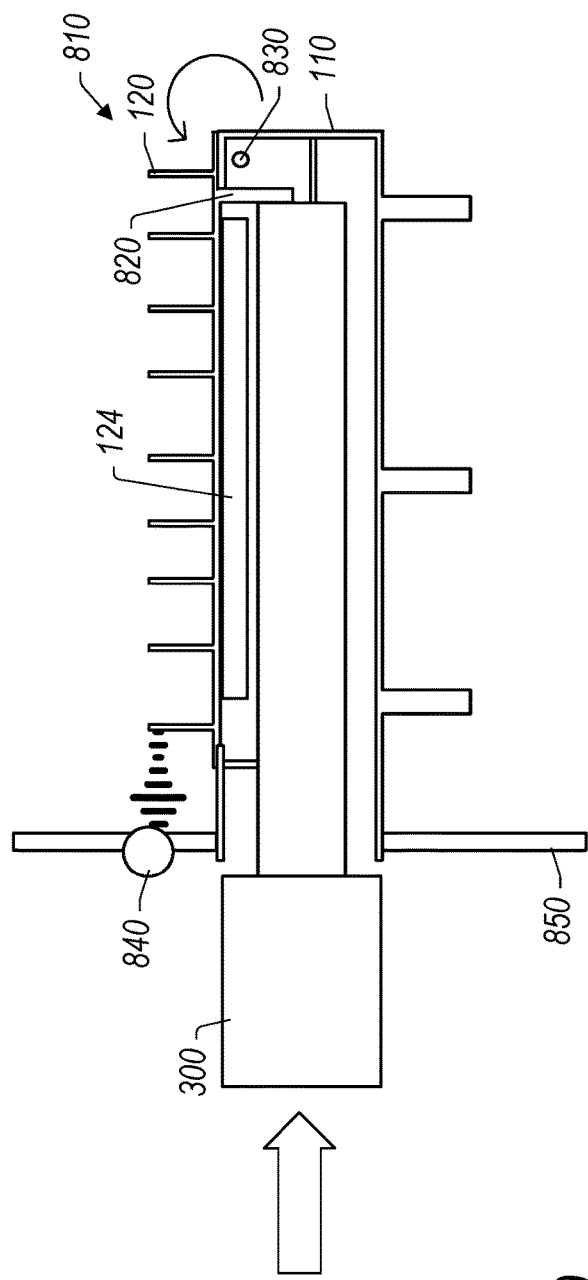

FIGS. 8 and 9 depict side-view representations of another alternative embodiment of a mechanism for lifting a heat sink during insertion of a signal interface device into a housing. In the illustrated embodiment, apparatus 800 includes housing 110, heat sink 120 with TIM 124, and lift mechanism 810. In certain embodiments, lift mechanism 810 includes actuator tab 820 and spring mechanism 830. Actuator tab 820 may be, for example, a wall extending downwards from an upper inside surface of heat sink 120. Spring mechanism 830 may include a pivot and a torsional spring coupled heat sink 120. Apparatus further includes spring-loaded lock 840 coupled to heat sink 120.

FIG. 8 depicts a half-way insertion point of signal interface device 300 into apparatus 800. As shown in FIG. 8, heat sink is lifted by the spring force of spring mechanism 830. It should be noted that if lock 840 is in the lock position without signal interface device 300 in place, it needs to be released manually (e.g., by press and release the ball lock mechanism) as lock 840 cannot move from the unlock position to the lock position on its own. As signal interface device 300 moves into housing 110, eventually the end of the signal interface device engages actuator tab 720. When signal interface device 300 engages actuator tab 720, the pushing force of the signal interface device may overcome the spring force of spring mechanism 830, causing heat sink 120 to pivot and lower, as shown in FIG. 9. At this position, spring-loaded lock 840 may engage with an opening in face plate 850, causing locking of the position of heat sink 120. For removal, spring-loaded lock 840 may be disengaged as signal interface device 300 is pulled out of housing 110.

The various methods as illustrated in the figures and described herein represent example embodiments of methods. The order of method may be changed, and various elements may be added, reordered, combined, omitted, modified, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:
1. A signal interface system, comprising:
   a transceiver cage configured to receive a signal interface device;
   a heat sink device;
   a thermal interface material (TIM) attached to a lower surface of the heat sink device, the TIM being configured to be positioned in an opening in an upper surface of the transceiver cage;
   a spring clip coupling the heat sink device to the transceiver cage, wherein sides of the spring clip are positioned along sides of the transceiver cage, and wherein the spring clip provides a spring force that moves the lower surface of the heat sink device towards the upper surface of the transceiver cage; and
   levers having axles attached to both sides of the spring clip, wherein the levers rotate about their axles with insertion portions of the levers inserting between the lower surface of the heat sink device and the upper surface of the transceiver cage when the signal interface device is received into the transceiver cage at a specified position, the insertion portions of the levers lifting the lower surface of the heat sink device and the TIM away from the upper surface of the transceiver cage.

2. The system of claim 1, wherein, when the signal interface device is received into the transceiver cage at the specified position, lock tabs on the transceiver cage move outwards, causing activator portions of the levers engaged with the lock tabs to move away from the sides of the transceiver cage and rotating the insertion portions of the levers to insert between the lower surface of the heat sink device and the upper surface of the transceiver cage.

3. The system of claim 1, wherein, when the signal interface device is fully received into the transceiver cage at a second specified position greater than the specified position, the levers rotate about their axles with the insertion portions of the levers moving out from between the lower surface of the heat sink device and the upper surface of the transceiver cage, the lower surface of the heat sink device then moving towards and in contact with the upper surface of the transceiver cage due to the spring force provided by the spring clip.

4. The system of claim 3, wherein, when the signal interface device is fully received into the transceiver cage at the second specified position, lock tabs on the transceiver cage move inwards and activator portions of the levers engaged with the lock tabs move towards the sides of the transceiver cage, allowing the insertion portions of the levers to rotate out from in between the lower surface of the heat sink device and the upper surface of the transceiver cage.

5. The system of claim 4, wherein, when the signal interface device is fully received into the transceiver cage at the second specified position, activation of a signal interface device removal mechanism associated with the transceiver cage causes the lock tabs to be pressed outwards, moving the activator portions of the levers engaged with the lock tabs away from the sides of the transceiver cage and rotating the insertion portions of the levers to insert between the lower surface of the heat sink device and the upper surface of the transceiver cage, thereby allowing the signal interface device to be removed from the transceiver cage while not in contact with the heat sink device.

6. A heat removal apparatus for a signal interface device, comprising:
a heat sink device configured to be coupled to a cage that receives a signal interface device;
a thermal interface material (TIM) attached to a lower surface of the heat sink device;
a spring mechanism coupled to the heat sink device, the spring mechanism being configured to provide a spring force that moves the heat sink device towards the cage; and
an actuator mechanism coupled to the heat sink device, the actuator mechanism being configured to lift the heat sink device away from the cage as the signal interface device is received in the cage, wherein the actuator mechanism includes at least one lever attached to the spring mechanism, the lever being configured to rotate an insertion portion of the lever underneath the heat sink device and lift the heat sink device away from the cage during insertion of the signal interface device into the cage.

7. The apparatus of claim 6, wherein the actuator mechanism is configured to allow the heat sink device to move towards the cage due to the spring force of the spring mechanism when the signal interface device is fully received in the cage.

8. The apparatus of claim 7, wherein the actuator mechanism is configured to lift the heat sink device away from the cage as the signal interface device is beginning to be removed from being fully received in the cage.

9. The apparatus of claim 6, wherein:
the spring mechanism includes a spring clip coupled to the heat sink device, wherein the spring clip is configured to provide the spring force that moves the heat sink device towards the cage, and wherein the at least one lever is attached to the spring clip.

10. The apparatus of claim 9, wherein the insertion portion of the lever has a beveled edge that engages a bottom surface of the heat sink device as the insertion portion rotates underneath the heat sink device.

11. The apparatus of claim 9, wherein the lever includes an activation portion, and wherein the activation portion is moved during insertion of the signal interface device into the cage to cause the lever to rotate and lift the heat sink device away from the cage.

12. The apparatus of claim 9, further comprising:
an additional spring mechanism coupled to the lever, wherein the additional spring mechanism is configured to cause rotation of the insertion portion of the lever underneath the heat sink device.

13. The apparatus of claim 9, wherein the spring clip includes side portions configured to be coupled to sides of the cage.

14. The apparatus of claim 13, wherein the lever is attached to one of the side portions of the spring clip, and wherein said side portion includes an opening for the insertion portion of the lever to rotate through and underneath the heat sink device.

15. The apparatus of claim 9, wherein a top portion of the spring clip provides the spring force by pressing downwards on the heat sink device towards the cage when the spring clip is coupled to the cage.

16. The apparatus of claim 6, wherein the heat sink device includes a plurality of fins on an upper surface of the heat sink device.

17. The apparatus of claim 6, wherein the thermal interface material (TIM) is positioned in a membrane, the membrane being attached to the lower surface of the heat sink device, and wherein the actuator mechanism is configured to lift the heat sink device away from the cage as the signal interface device is received in the cage to provide clearance between the membrane and the cage.

18. A heat removal apparatus for a connector, comprising:
a heat sink device configured to be coupled to a housing that receives a connector;
a spring clip having a top portion and left and right side portions, wherein the top portion is configured to be coupled to the heat sink device and the left and right side portions are configured to be positioned on sides of the housing, and wherein the spring clip is configured to provide a spring force that moves the heat sink device towards the housing, and wherein the left and right side portions of the spring clip have openings;
a left side lever attached to the left side portion of the spring clip, wherein an insertion portion of the left side lever is configured to rotate into and out of a space underneath the heat sink device through the opening in the left side portion of the spring clip; and
a right side lever attached to the right side portion of the spring clip, wherein an insertion portion of the right side lever is configured to rotate into and out of a space underneath the heat sink device through the opening in the right side portion of the spring clip.

19. The apparatus of claim 18, wherein rotation of the insertion portions of the left side lever and the right side lever into the space underneath the heat sink device lifts the heat sink device away from the housing.

20. The apparatus of claim 18, wherein rotation of the insertion portions of the left side lever and the right side lever out of the space underneath the heat sink device allows the heat sink device to contact the housing.

\* \* \* \* \*